US006895410B2

(12) United States Patent
Ridge

(10) Patent No.: US 6,895,410 B2
(45) Date of Patent: May 17, 2005

(54) METHOD AND APPARATUS FOR PROVIDING A MULTIMEDIA DATA STREAM

(75) Inventor: Justin Ridge, Sachse, TX (US)

(73) Assignee: Nokia Corporation, Espoo (FI)

( * ) Notice: Subject to any disclaimer, the term of this patent is extended or adjusted under 35 U.S.C. 154(b) by 56 days.

(21) Appl. No.: 10/429,281

(22) Filed: May 2, 2003

(65) Prior Publication Data

US 2004/0220966 A1 Nov. 4, 2004

(51) Int. Cl.$^7$ ................................................ G06F 7/30
(52) U.S. Cl. ..................... 707/104.1; 707/101; 707/102
(58) Field of Search ................... 707/1–104.1; 455/448, 455/452; 709/200, 231, 247, 203, 217–219, 250, 230; 370/476, 517, 230–231, 395.6, 477; 711/111, 101–1; 375/240, 244; 348/464, 467, 518, 512; 382/239, 232

(56) References Cited

U.S. PATENT DOCUMENTS

| | | | |
|---|---|---|---|
| 4,816,906 A | * 3/1989 | Kummerfeldt et al. | 348/402.1 |
| 5,359,595 A | * 10/1994 | Weddle et al. | 370/468 |
| 5,594,554 A | 1/1997 | Farkash et al. | |
| 5,677,689 A | 10/1997 | Yovanof et al. | |
| 5,859,872 A | * 1/1999 | Townshend | 375/242 |
| 6,233,359 B1 | 5/2001 | Ratnakar et al. | |
| 6,243,761 B1 | 6/2001 | Mogul et al. | |
| 6,308,072 B1 | * 10/2001 | Labedz et al. | 455/448 |
| 6,374,112 B1 | * 4/2002 | Widegren et al. | 455/452.2 |
| 6,419,671 B1 | * 7/2002 | Lemberg | 606/5 |
| 6,535,232 B1 | * 3/2003 | Tsuda et al. | 715/849 |
| 6,608,832 B2 | * 8/2003 | Forslöw | 370/353 |
| 6,760,772 B2 | * 7/2004 | Zou et al. | 709/230 |
| 2002/0146024 A1 | * 10/2002 | Harris et al. | |
| 2002/0152319 A1 | * 10/2002 | Amin et al. | |
| 2002/0169441 A1 | * 11/2002 | Lemberg | 606/5 |
| 2003/0009580 A1 | * 1/2003 | Chen et al. | |
| 2003/0063564 A1 | * 4/2003 | Ha et al. | |
| 2003/0128749 A1 | * 7/2003 | Bruas | 375/222 |
| 2003/0179720 A1 | * 9/2003 | Cuny | |
| 2004/0037291 A1 | * 2/2004 | Attar et al. | |

FOREIGN PATENT DOCUMENTS

| | | |
|---|---|---|
| JP | 0737059 | 2/1995 |
| JP | 1306067 | 11/1999 |

OTHER PUBLICATIONS

T.M. Cover & J.A. Thomas, *Elements of Information Theory*, pp. 250–253, Wiley 1991 ISBN 0471062596.
U.S. Appl. No. 10/090,436, filed Feb. 28, 2002, Ridge.
U.S. Appl. No. 10/090,425, filed Feb. 28, 2002, Ridge.

* cited by examiner

*Primary Examiner*—Luke S Wassum
*Assistant Examiner*—Linh Black
(74) *Attorney, Agent, or Firm*—Ware, Fressola, Van Der Sluys & Adolphson LLP

(57) ABSTRACT

A method and corresponding equipment (11) for encoding different types of objects of a multimedia data stream so as to provide improved overall quality (Q), according to relationships (11b) between quality ($Q_i$) and encoding size/transmission rate ($R_i$) for each object, and according to penalties (11c) for removing objects from the multimedia data stream. A multimedia data stream is provided in which the quality of the different objects tends to be similar according to rules provided by the invention for assigning a value of quality to each of the different kinds of objects of the multimedia stream.

19 Claims, 3 Drawing Sheets

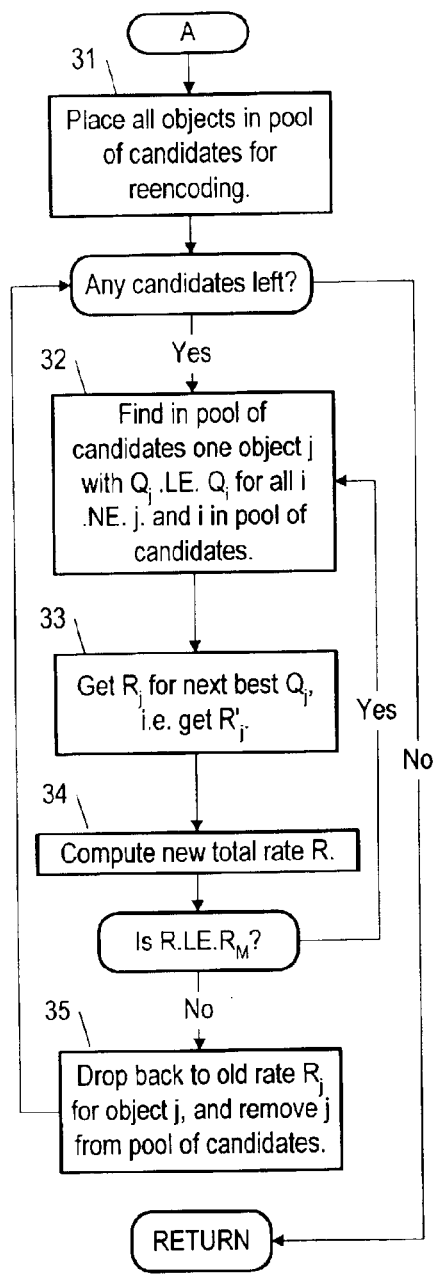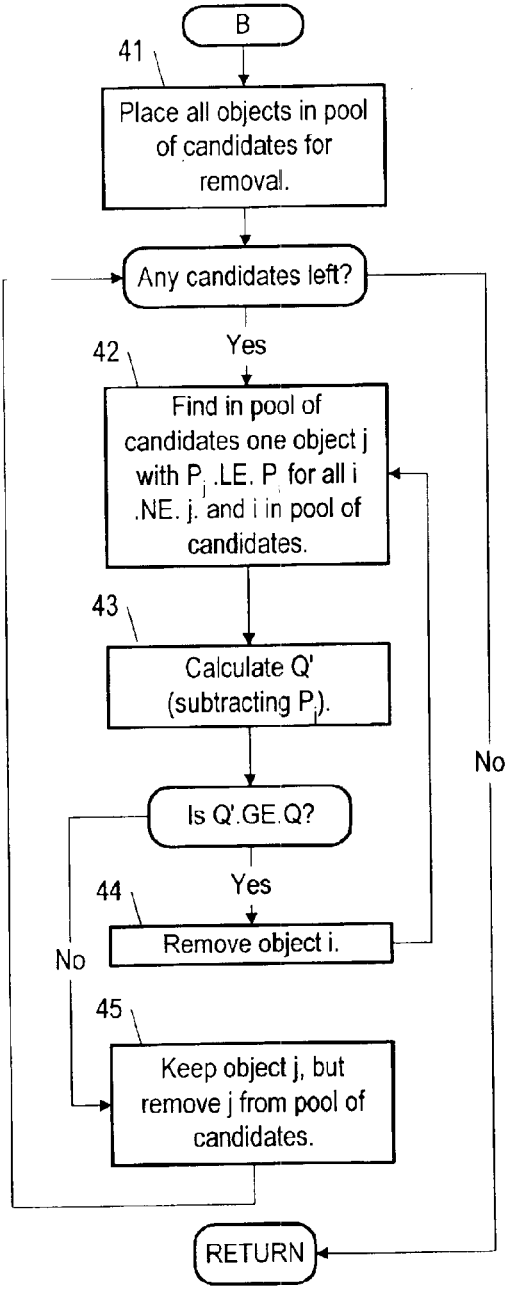
FIG. 3
FIG. 4

METHOD AND APPARATUS FOR PROVIDING A MULTIMEDIA DATA STREAM

TECHNICAL FIELD

The present invention relates to communicating a multimedia message via a telecommunication system providing a communication channel or set of channels for the multimedia message, where either the data rate for the channel (or channels) is subject to a rate constraint, or the overall size of the multimedia message is subject to a size constraint, or both the channel (or channels) data rate and message size are constrained. More particularly, the present invention relates to encoding the different objects of a multimedia message so as to provide a high overall quality either in terms of some measure of overall quality, or in terms of both a measure of overall quality and a measure of the uniformity in quality of the different objects of the message.

BACKGROUND ART

In some telecommunication protocols, objects of a multimedia data stream (i.e. a set of sequences of bits that must all be communicated in the same period of time so as to jointly convey information, for example an audio clip object synchronized with a video clip object) are subjected to an overall size constraint, i.e. the total number of bits in the multimedia data stream is not permitted to exceed some number of bits. Such a constraint may be due to the protocol itself, or due to other factors such as limitations of the device sending or receiving the multimedia data stream (e.g. the size of memory included in either of the devices). An additional or alternative constraint may exist if one or more communication channels used in communicating the message are subject to a maximum rate limitation. Corresponding to the maximum allowed data rate and/or size are maximum allowed sizes of the different objects making up the multimedia data stream. Thus, in a telecommunication system providing a channel or set of channels (each possibly subject to an individual or collective rate limitation) for communication of a multimedia data stream, there is a data size budget that must be adhered to, or a corresponding data rate allowance that must not be exceeded. In other words, in a multimedia data stream conveying N objects, the rates/sizes $R_i$ of the different individual objects i making up the multimedia data stream must be such that, $$\sum_{i=1}^{N} R_i \leq R_M$$

where $R_M$ is a maximum allowed total data rate/size.

In view of such a limitation, given a set of different types of objects to be communicated over a telecommunication system, the problem arises as to how best to encode the different objects so as to have a total data rate/size less than or equal to the maximum allowed total data rate/size, and yet have a high overall quality according to some measure of quality. Although quality is generally understood to be subjective, it is reasonable to suppose that the overall quality of a multimedia data stream is higher if the different types of objects making up the multimedia data stream are all communicated so as to have roughly the same quality, as opposed to a data stream in which say one object (e.g. a video clip) is communicated so as to have a high quality, and another object, of more or less equal importance (e.g. a corresponding audio clip), is communicated so as to have a poor quality.

Thus, what is needed is a solution to the problem of how to encode the different objects of a multimedia data stream so as to provide a high overall quality, at least according to some reasonable measure of overall quality, and yet to make possible communicating the multimedia data stream by ensuring that its total rate/size is sufficiently low.

DISCLOSURE OF THE INVENTION

Accordingly, in a first aspect of the invention, a method is provided by which a multimedia data stream conveying a plurality of objects of different types is provided at a total data rate less than or equal to a maximum allowed total data rate, characterized by: a step in which for each object of the data stream a relationship is established between different encoded data rates used for transmitting the object and a resulting corresponding quality indicating a measure of quality for the transmitted object; and a step in which, using the established relationships, for an object included in the multimedia data stream and having a generally low value of quality based on a currently selected data rate compared to values of quality for other objects of the multimedia data stream based on currently selected values of data rate values for the other objects, a higher data rate value is selected, provided that the higher data rate value does not result in the total data rate exceeding the maximum allowed total data rate.

In accord with the first aspect of the invention, the relationship between different encoded data rates used for transmitting the object and a resulting corresponding quality may assign values for quality given an encoded data rate based upon statistical characteristics of the object. Further, the quality values may be estimated from statistical characteristics of the received object either without performing encoding or re-encoding of the object or after performing encoding or re-encoding of the object.

Also in accord with the first aspect of the invention, the relationship for an object may assign a quality value to each transmission rate in a set of discrete transmission rate values, or may assign a quality value to any transmission rate in a range of discrete transmission rate values.

Also in accord with the first aspect of the invention, the relationship may assign a quality value to an object for a specified transmission rate in a range common to all objects, regardless of type.

Also in accord with the first aspect of the invention, the relationship (11b) for an image type of object may be expressible as:

$$Q_i = \alpha q + \sum_r \beta_r \sigma_r^2,$$

where $\sigma_r^2$ is a spectral variance for the object at a coefficient position indicated by r, and the value of $\sigma_r^2$ depends on at least the transmission rate, q indicates a quantizer scale and also depends on the transmission rate, and $\alpha$ and each $\beta_r$ are weighting values.

Also in accord with the first aspect of the invention, the relationship for an image type of object may be expressible as:

$$Q_i = \alpha N + \beta \sigma^2 + \lambda R_L,$$

where N indicates the number of colors in the object and depends on the transmission rate, $\sigma^2$ indicates the color variation of the object and depends on the transmission rate, $R_L$ indicates an average run-length defining a solidity for the object and also depends on the transmission rate, and where α,β,λ are weighting values.

Also in accord with the first aspect of the invention, the method may further comprise: a step in which, if the overall quality of the multimedia data stream is improved by removing an object from the multimedia data stream according to some predetermined measure for the overall quality without the object, then the object is removed. Further, the predetermined measure for the overall quality without the object may take into account a predetermined penalty for removing the object.

In a second aspect of the invention, an apparatus is provided comprising means for performing the steps of the invention according to the first aspect of the invention.

In a third aspect of the invention, a system is provided comprising: an apparatus according to the second aspect of the invention and responsive to the multimedia data stream, for providing a quality-improved multimedia data stream; a server for providing the multimedia data stream; a radio access network, responsive to the quality-improved multimedia data stream, for wirelessly transmitting the quality-improved multimedia data stream to an intended wireless terminal; and the wireless terminal, responsive to the wirelessly transmitted quality-improved multimedia data stream.

In a fourth aspect of the invention, a computer program product is provided comprising: a computer readable storage structure embodying computer program code thereon for execution by a computer processor in an apparatus by which a multimedia data stream conveying a plurality of objects of different types is provided at a total data rate less than or equal to a maximum allowed total data rate, with said computer program code characterized in that includes instructions for performing the steps of a method according to the first aspect of the invention.

BRIEF DESCRIPTION OF THE DRAWINGS

The above and other objects, features and advantages of the invention will become apparent from a consideration of the subsequent detailed description presented in connection with accompanying drawings, in which:

FIG. 3 is a flowchart of a water-filling type of algorithm that might be used by the method illustrated in FIG. 2; and FIG. 4 is a flowchart of an algorithm for removing an object from a multimedia data stream, an algorithm that might also be used by the method illustrated in FIG. 2.

BEST MODE FOR CARRYING OUT THE INVENTION

Figure 1A:
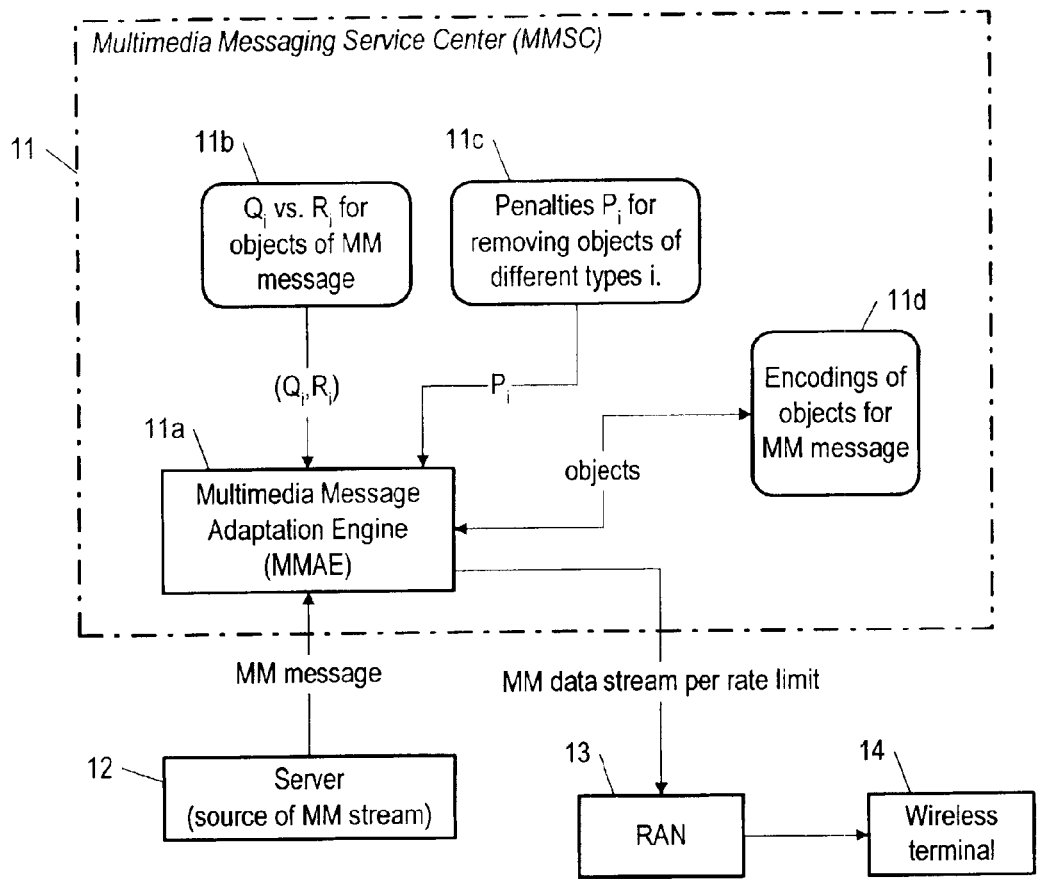
FIG. 1A is a block diagram/flow diagram of components of a telecommunication system involved in providing a multimedia data stream to a wireless terminal.

Referring now to FIG. 1, a wireless terminal 14 is shown receiving a multimedia data stream from a MMAE (Multimedia Message Adaptation Engine 11a of a MMSC (multimedia messaging service center) 11 via a RAN (radio access network) 13 at a total rate R that is less than or equal to a maximum allowed total rate $R_M$, the rate R being the sum of the rates required to communicate the individual objects of the multimedia message, i.e., assuming the multimedia message includes N objects, $$R = \sum_{i=1}^{N} R_i, \quad \text{and} \quad R \leq R_M,$$

where $R_i$ is the rate used for communicating object i out of the N objects in the message. The multimedia message communicated by the multimedia data stream is originally provided to the MMSC 11 by a server 12 and stored in a data store 11d. It is assumed here that the multimedia message is too large to be delivered to a recipient, so that the MMAE 11a must reencode one or more of the objects at a lower quality. According to the invention, in determining how to reencode one or more of the objects, the MMAE 11a analyses each object to determine one or more essential characteristics of the object, then uses a predetermined relationship preferably in the form of a mathematical equation (which depends upon the type of object) to estimate a relationship between rate and quality. As the relationship is determined for each object (e.g. in the form of pairs of $(Q_i, R_i)$ values, or even as a continuous curve or formula with values for all constants and coefficients), information indicating the relationship is stored in a data store 11b. The MMAE 11a uses these relationships to determine how to encode the different objects so as to communicate the multimedia message with high overall quality Q but at a rate R low enough to be acceptable, as explained below. According to the invention, a procedure is used in which the rate/size $R_i$ for each object is initially selected to be as low as possible, and then, as explained in more detail below, an object having a generally low value of quality $Q_i$ is identified, and a next higher rate than the currently selected rate is then selected for that object, assuming that the next higher rate does not result in too high an overall rate R. The process repeats until no further quality increases are possible without exceeding the overall rate constraint. Such a procedure provides a higher value of the overall quality Q, and, at the same time, tends to provide a multimedia data stream in which the quality of each object $Q_i$ is roughly the same. Once the final rate values $R_i$ are selected, the objects are reencoded and stored (temporarily) for transmission in the data store 11d, which then serves as a buffer for the multimedia data stream.

The overall quality Q is, according to the invention, preferably a simple sum of qualities of the individual objects of the invention, i.e.

$$Q = \sum_{i=1}^{N} Q_i, \quad (1)$$

where $Q_i$ is the quality for the ith object of the multimedia data stream, and is determined from the rate/size $R_i$ for the object according to the estimated relationship between rate $R_i$ and quality $Q_i$ for that object.

In addition to possibly reencoding one or more of the data objects, as explained below the MMAE 11a may also remove one or more objects from the multimedia message if, even taking into account a penalty associated with such a removal, the overall quality of the multimedia message/multimedia data stream is improved; penalties Pi for removing different types i of objects are preferably predetermined and held in a data store 11c accessible to the MMAE 11a. If the original multimedia data stream includes N objects, and the penalty for removing the $N^{th}$ object is determined to be some value $P_N$, the overall quality after removing the $N^{th}$ object would be:

$$Q = \sum_{i=1}^{N-1} Q_i - P_N. \quad (2)$$

Figure 1B:
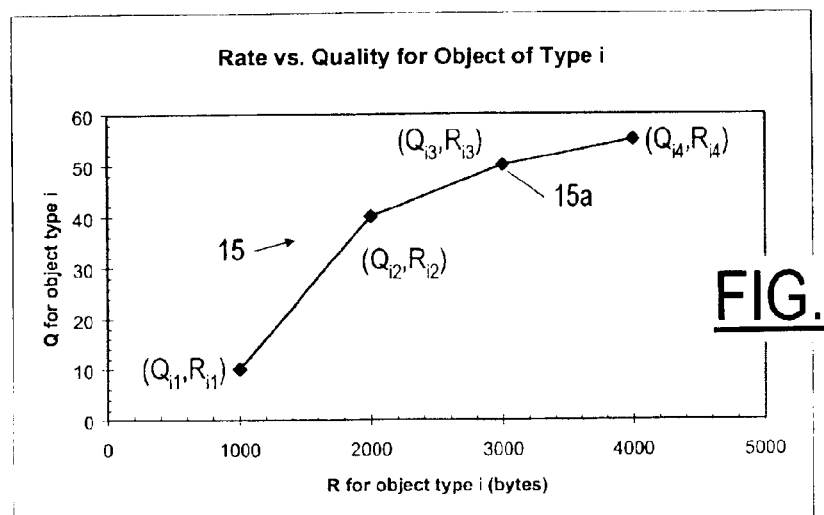
FIG. 1B is a graphical representation of a rate vs. quality relationship for a particular type of object that might be included in a multimedia data stream.

Referring now to FIG. 1B, an illustrative relationship between rate $R_i$ and quality $Q_i$ for object i can be indicated as a continuous curve/line 15 or as a set of M discrete pairs $(R_{i1}, Q_{i1})$, $(R_{i2}, Q_{i2})$, . . . , $(R_{iM}, Q_{iM})$ of values 15a. Correspondingly, the mathematical system used to estimate the rate-quality relationship may be either a single equation, or a discrete set of equations. In the description that follows, the relationship of rate to quality is assumed to be discrete, i.e. a set of M discrete pairs $(R_{i1}, Q_{i1})$, $(R_{i2}, Q_{i2})$, . . . , $(R_{iM}, Q_{iM})$ of values 15a for each object (with the object indicated by the index i), and with possibly different values of M for different object types. The use of the continuous form instead of the discrete form requires only the use of a step of some finite (vs. infinitesimal) size in rate or quality to arrive at a next, $j^{th}$, pair $(R_{ij}, Q_{ij})$ of values 15a.

In determining the sets of $(R_i, Q_i)$ pairs indicating relationships between rate and quality for different types of objects (or even different types/formats of encodings of different types of objects, such as JPEG (Joint Photographic Expert Group), GIF (Graphic Interchange Format) or PNG (Portable Network Graphics) formats for an image), a linear quality scale (as opposed to linear relation) is preferable, with a range of 0–100 selected for simplicity. According to this embodiment, a quality value of 0 corresponds to no quality whatsoever (e.g. in the case of an audio object, the object sounds like white noise). Although to some extent it is difficult to compare the quality of different kinds of objects (e.g. it is difficult to compare the quality of an audio clip with the quality of a video clip), it is certainly possible to do so, and using the same linear scale for quality for all types of objects does permit doing so, even if the results of such a comparison are debatable. As an example, according to such an approach, i.e. using the same scale for all types of objects, an audio object encoded for communication at some rate $R_1$ and having a corresponding quality value $Q_1$ of 50 (according to the estimated relationship between quality and rate for that object) would be assumed to be perceived as of lower quality than a video image having a quality value $Q_2$ of 90 when encoded for communication at some other rate $R_2$ not necessarily higher or lower than the rate $R_1$.

Although the quality scale is preferably linear and normalized to the same range (e.g. 0–100) for all object types, how to arrive at a quality value for different types of objects, i.e. how to map media characteristics to the quality scale, is different for different types of objects and even for different formats for the same type of object. In case of JPEG images, for example, a quantizer scale q value, which depends on the transmission rate/size, and spectral variance values $\sigma_r^2$ (the variance of coefficient values when considering coefficients of index r drawn from each block of transform coefficients, each such block of transform coefficients being produced according to the JPEG encoding procedure), which depends on both the transmission rate/size and the content of the specific image, can be mapped to quality Q for such an object, such as by use of the linear relation, $$Q_{JPEG} = \alpha q + \sum_r \beta_r \sigma_r^2, \quad (3)$$

where $\alpha$ and the $\beta_r$ are (normalized) weights. In case of a GIF image, the number of colors N, amount of color variation $\sigma^2$ within the image, and solidity defined by an average run-length $R_L$ can be mapped to quality, such as according to the linear relation, $$Q_{GIF} = \alpha N + \beta \sigma^2 + \lambda R_L, \quad (4)$$

where $\alpha, \beta, \lambda$ are again weights selected so that the quality value $Q_{GIF}$ gives a quality measure for the image, a measure that is reasonably independent of the type of object, and which therefore may be directly compared with quality measures for objects of other types particularly if the Q value is normalized so as to always fall in some predetermined range, such as 0–100.

Ideally, in using the invention, the rate vs. quality relationships for objects of different types would be, for the most part, computed once and for all and saved. However, in practice, it is usually not possible to get a generalized curve (relationship) for each type of object because there is too much variation even between objects of the same type. Therefore, $Q_i$ vs. $R_i$ curves are estimated for each object individually, as each object is encountered, and so are determined dynamically, i.e. they usually cannot be precomputed ready for use as needed. What usually is done in advance is determining an equation to use in later (dynamically) determining the $Q_i$ vs. $R_i$ curves, equations such as eq. (3) or (4) above, using simple statistics from the object as input parameters. For example, in a GIF image, the number of colors could be one input parameter to a mathematical equation relating rate and quality. Then when a GIF image is encountered, the mathematical equation describing the rate vs. quality relationship would be evaluated using as the input parameter the observed number of colors characteristic to the specific GIF image that is encountered, leading to an estimated rate vs. quality curve.

Figure 2:
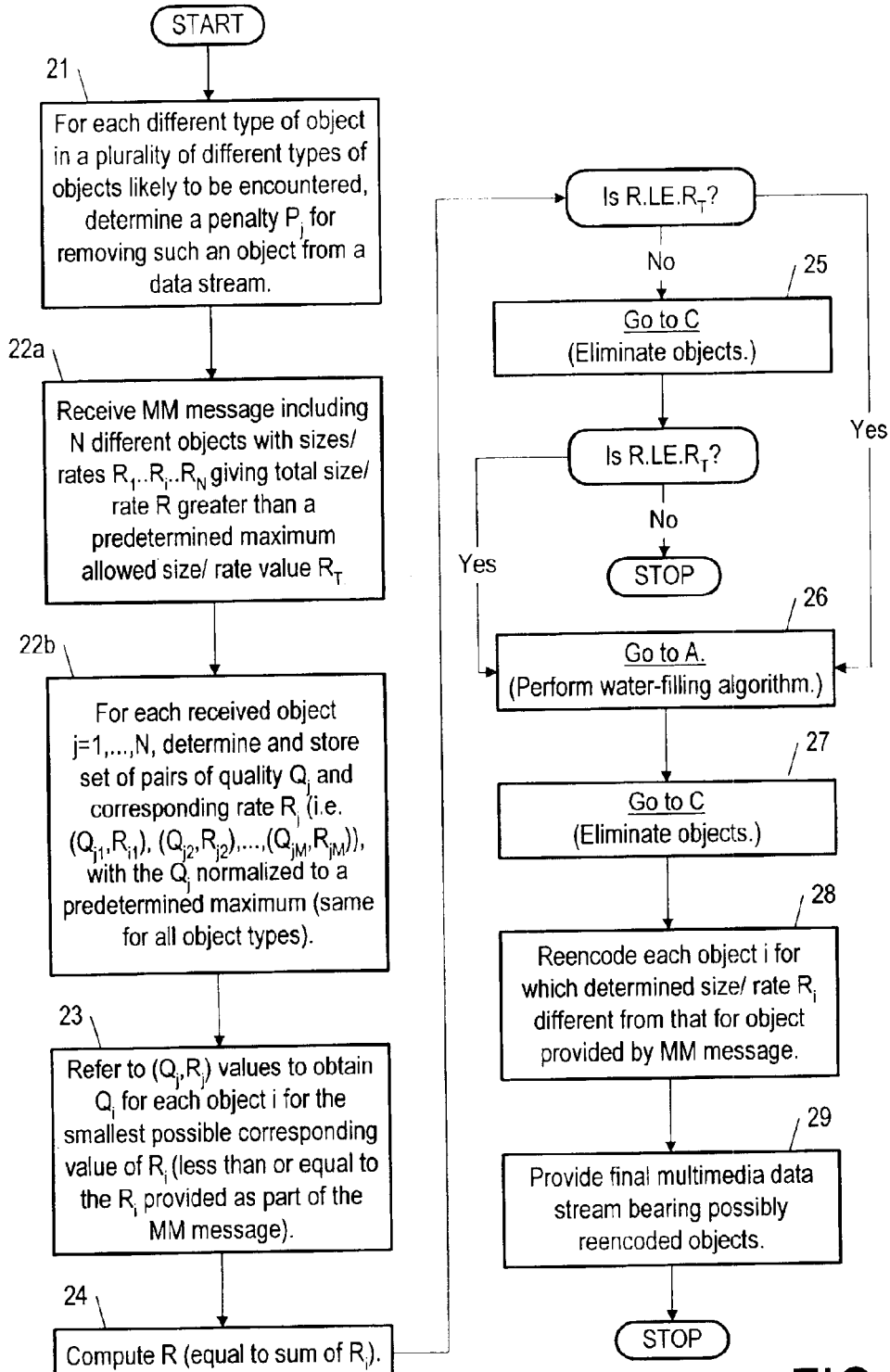
FIG. 2 is a flowchart of a method according to the invention for providing an improved quality multimedia data stream.

Referring now to FIG. 2 and also to FIG. 1A, according to the invention, usually preliminary to receiving an MM message, in a first step 21, for each different type of object likely to be encountered, or at least likely to ever be considered for removal from a MM message, MMAE 11a determines a penalty Pi for removing such an object from a multimedia data stream and stores it in data store 11c.

With MMAE 11a now prepared to receive a MM message and provide a corresponding high quality multimedia data stream, in a next step 22a, MMAE 11a receives a MM message including (say) N different objects with sizes/rates $R_i$ . . . $R_i$ . . . $R_N$ giving a total size/rate R greater than a predetermined maximum allowed size/rate value $R_M$. In a next step 22b, MMAE 11a analyzes the objects to compute values for predetermined key characteristics for each object (such as number of colors of the object), and the characteristics so computed are then used to determine a rate versus quality curve/relationship (which could be discrete, or could be algorithmic) for each object, using a predetermined form for the relationship (preferably an equation, such as eqs. (3) or (4)), and stores the relationship in data store 11b. The characteristics used depend upon the type of the object being processed, as described above. (For example, in the case of a JPEG image, quantizer scale and spectral variance may be used as described previously.) In a next step 23, from the data store 11b, the MMAE obtains the $Q_i$ for each object i corresponding to the smallest possible value of $R_i$ for which a $Q_i$ was estimated (the value $R_i$ used here being no larger than the value of $R_i$ for the object provided with the MM message, since it is not possible for MMAE 11a to reencode an object so as to have higher quality than the original object, i.e. the object provided as part of the MM message). In a next step 24, MMAE 11a computes R as the sum of the individual rates/sizes $R_i$, i.e. according to:

$$R = \sum_{i=1}^{N} R_i. \quad (5)$$

If R with the smallest possible rates/sizes is still greater than $R_M$, then in a next step 25, MMAE 11a attempts to eliminate some objects as described below in connection with FIG. 4. Afterwards, if R with possibly some objects removed, is still not small enough, MMAE 11a stops processing the MM message (and would then send an error message to server 12). If, however, R with the smallest possible rates/sizes or after possibly removing some objects is smaller than $R_M$, then it may be possible to increment the quality of one or more of the objects, and so in a next step 26, MMAE 11a executes a so-called water-filling algorithm, described below in connection with FIG. 3. After executing the so-called water-filling algorithm, it may still be possible to improve the quality of the multimedia data stream by removing some objects, and so in a next step 27, MMAE 11a again attempts to remove objects from the multimedia data stream. Preferably, there is an iteration between removing objects and the use of the water-filling algorithm until no further changes are made to the multimedia data stream. After the rates $R_i$ for the different objects are selected according to the above steps, in a next step 28 MMAE 11a reencodes each object i for which a size/rate $R_i$ has been selected that is different from that provided for the object as provided by the MM message. Then in a final step 29, MMAE 11a provides the multimedia data stream bearing possibly reencoded objects with selected sizes/rates $R_i$ (and corresponding qualities $Q_i$).

Referring now to FIG. 3, the water-filling algorithm used by MMAE 11a to increment the rates $R_i$ of the different objects of the MM message so as to provide roughly the same quality $Q_i$ for each object is shown as including a first step 31 of placing all objects in a pool of candidates for reencoding. In a next step 32, one candidate is selected having a quality $Q_j$ that is either less than the qualities of any of the other objects or at least small compared to the average of the qualities of the other objects. In a next step 33, MMAE 11a refers to the data store 11b to find a rate $R_j$ for the next best $Q_j$, and in so doing, if instead of discreet pairs of values being stored in the data store 11b continuous relationships are stored, the next best $Q_j$ is the current value of the $Q_j$ plus some predetermined increment. In a next step 34, a new total rate R is computed. If this new total rate is still less than $R_M$ then the step 32 of finding a low quality object in the pool of candidates is repeated. If however the new value of R is larger than $R_M$, then in a next step 35 the object j for which an increment in quality was attempted is removed from the pool of candidates. This process is repeated until all candidates are removed from the pool.

Referring now to FIG. 4, the algorithm used to attempt to remove an object from the multimedia message is shown as including a first step 41 in which again all of the objects are placed in a pool of candidates, this time candidates for removal. In a next step 42, one of the candidates is selected as a candidate for removal based on having a penalty for removal that is less than that for any of the other objects in the pool of candidates. In a next step 43, an original overall quality Q is calculated using eq. (1) and then a new overall quality called Q' is calculated according to eq. (2), assuming that the object identified above, in step 42, is to be removed (although a final decision to remove depends on the new value of the overall quality Q' compared to the original value Q). If the new overall quality Q' is at least equal to the previous (original or later starting value of) overall quality Q, then in a next step 44, the object is removed, and then the step 42 of identifying a candidate for removal is repeated, using Q' as the new starting value Q. If however the new overall quality Q' is at not at least equal to the overall quality Q without removal of the object, then the object is not removed from the multimedia data stream, but it is removed from the pool of candidates, and the process of potentially removing an object is then repeated beginning again with the step 42 of identifying a candidate for removal.

A method according to the invention can be implemented as either hardware (including firmware) or software. In particular, steps of a method according to the invention can be provided as instructions forming a computer program hosted by one or more servers of the MMSC 11 (FIG. 1), and more specifically, as instructions forming computer program modules that are included as part of the MMAE 11a.

It is important to understand that the invention encompasses not only computing the quality values $Q_i$ from the statistics of an object that has been encoded or re-encoded for transmission at a rate $R_i$, but also estimating the quality values $Q_i$ for an object from the statistics of the object as originally received, before any encoding or re-encoding by the MMSC 11 (FIG. 1). Typically, for a given object, a "candidate" size (having an associated rate of transmission) $R_i$ is chosen, and then a value $Q_i$ corresponding to the chosen size $R_i$ is estimated from the statistics of the originally received image. For example, upon receiving a 30 KB JPEG image file, the MMSC 11 (FIG. 1) would choose a set of $R_i$'s (e.g. 10, 15, 20, 25 KB). Based on the statistics of the original 30 KB JPEG image file, the MMAE 11a would estimate a $Q_i$ value for each of the four chosen $R_i$ values. This allows determining (re-) encoder settings (yielding the different $Q_i$ values for the different chosen $R_i$ values) for an object without actually reencoding the object. However, it is also possible to calculate the $Q_i$ value for a chosen $R_i$ after actually reencoding the object for the chosen $R_i$, and the invention encompasses such a procedure for calculating a quality value $Q_i$ for a chosen $R_i$. (However the $Q_i$ are determined, typically there is also a "check step" performed after choosing a new rate/size for each object and performing the (re-) encoding for transmission, to make sure that the overall rate does in fact satisfy the overall limit.)

It is to be understood also that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method by which a multimedia data stream conveying a plurality of objects of different types is provided at a total data rate (R) less than or equal to a maximum allowed total data rate ($R_M$), characterized by:

a step (22b) in which for each object of the data stream a relationship (11b) is established between different encoded data rates ($R_i$) used for transmitting the object and a resulting corresponding quality ($Q_i$) indicating a measure of quality for the transmitted object; and a step (33) in which, using the established relationships (11b), for an object included in the multimedia data stream and having a generally low value of quality ($Q_j$) based on a currently selected data rate ($R_j$) compared to values of quality ($Q_k$) for other objects of the multimedia data stream based on currently selected values of data rate values ($R_k$) for the other objects, a higher data rate value ($R'_j$) is selected, provided that the higher data rate value ($R'_j$) does not result in the total data rate (R) exceeding the maximum allowed total data rate ($R_M$).

2. A method as in claim 1, wherein the relationship (11b) between different encoded data rates ($R_i$) used for transmitting the object and a resulting corresponding quality ($Q_i$) assigns values for quality ($Q_i$) given an encoded data rate ($R_i$) based upon statistical characteristics of the object.

3. A method as in claim 2, wherein the quality values ($Q_i$) are estimated from statistical characteristics of the received object either without performing encoding or re-encoding of the object or after performing encoding or re-encoding of the object.

4. A method as in claim 1, wherein the relationship (11b) for an object assigns a quality value ($Q_i$) to each transmission rate ($R_i$) in a set of discrete transmission rate values ($R_i$).

5. A method as in claim 1, wherein the relationship (11b) for an object assigns a quality value ($Q_i$) to any transmission rate ($R_i$) in a range of discrete transmission rate values ($R_i$).

6. A method as in claim 1, wherein the relationship (11b) assigns a quality value ($Q_i$) to an object for a specified transmission rate ($R_i$) in a range common to all objects, regardless of type.

7. A method as in claim 1, wherein the relationship (11b) for an image type of object is expressible as:

$$Q_i = \alpha q + \sum_r \beta_r \sigma_r^2,$$

where $\sigma_r^2$ is a spectral variance for the object at a coefficient position indicated by r, and the value of $\sigma_r^2$, depends on at least the transmission rate ($R_i$), q indicates a quantizer scale and also depends on the transmission rate ($R_i$), and $\alpha$ and each $\beta$, are weighting values.

8. A method as in claim 1, wherein the relationship (11b) for an image type of object is expressible as:

$Q_i = \alpha N + \beta \sigma^2 + \lambda R_L,$ where N indicates the number of colors in the object and depends on the transmission rate ($R_i$), $\sigma^2$ indicates the color variation of the object and depends on the transmission rate ($R_i$), $R_L$ indicates an average run-length defining a solidity for the object and also depends on the transmission rate ($R_i$), and where $\alpha,\beta,\lambda$ are weighting values.

9. A method as in claim 1, further comprising:
a step (43) in which, if the overall quality (Q) of the multimedia data stream is improved by removing an object from the multimedia data stream according to some predetermined measure (eq. (2)) for the overall quality (Q) without the object, then the object is removed.

10. A method as in claim 9, wherein the predetermined measure (eq. (2)) for the overall quality (Q) without the object takes into account a predetermined penalty for removing the object.

11. An apparatus (11a), comprising means for performing the steps of claim 1.

12. An apparatus (11a), comprising means for performing the steps of claim 2.

13. An apparatus (11a), comprising means for performing the steps of claim 6.

14. A system, comprising:
an apparatus (11a) according to claim 11 and responsive to the multimedia data stream, for providing a quality-improved multimedia data stream;
a server (12), for providing the multimedia data stream;
a radio access network (13), responsive to the quality-improved multimedia data stream, for wirelessly transmitting the quality-improved multimedia data stream to an intended wireless terminal (14); and
the wireless terminal (14), responsive to the wirelessly transmitted quality-improved multimedia data stream.

15. A system, comprising:
an apparatus (11a) according to claim 12 and responsive to the multimedia data stream, for providing a quality-improved multimedia data stream;
a server (12), for providing the multimedia data stream;
a radio access network (13), responsive to the quality-improved multimedia data stream, for wirelessly transmitting the quality-improved multimedia data stream to an intended wireless terminal (14); and
the wireless terminal (14), responsive to the wirelessly transmitted quality-improved multimedia data stream.

16. A system, comprising:
an apparatus (11a) according to claim 13 and responsive to the multimedia data stream, for providing a quality-improved multimedia data stream;
a server (12), for providing the multimedia data stream;
a radio access network (13), responsive to the quality-improved multimedia data stream, for wirelessly transmitting the quality-improved multimedia data stream to an intended wireless terminal (14); and
the wireless terminal (14), responsive to the wirelessly transmitted quality-improved multimedia data stream.

17. A computer program product comprising: a computer readable storage structure embodying computer program code thereon for execution by a computer processor in an apparatus (11a) by which a multimedia data stream conveying a plurality of objects of different types is provided at a total data rate (R) less than or equal to a maximum allowed total data rate ($R_M$), with said computer program code characterized in that includes instructions for performing the steps of the method of claim 1.

18. A computer program product comprising: a computer readable storage structure embodying computer program code thereon for execution by a computer processor in an apparatus (11a) by which a multimedia data stream conveying a plurality of objects of different types is provided at a total data rate (R) less than or equal to a maximum allowed total data rate ($R_M$), with said computer program code characterized in that includes instructions for performing the steps of the method of claim 2.

19. A computer program product comprising: a computer readable storage structure embodying computer program code thereon for execution by a computer processor in an apparatus (11a) by which a multimedia data stream conveying a plurality of objects of different types is provided at a total data rate (R) less than or equal to a maximum allowed total data rate ($R_M$), with said computer program code characterized in that includes instructions for performing the steps of the method of claim 6.

* * * * *